US009990355B2

(12) United States Patent
Banatwala et al.

(10) Patent No.: US 9,990,355 B2
(45) Date of Patent: Jun. 5, 2018

(54) CHECKING DOCUMENTS FOR SPELLING AND/OR GRAMMATICAL ERRORS AND/OR PROVIDING RECOMMENDED WORDS OR PHRASES BASED ON PATTERNS OF COLLOQUIALISMS USED AMONG USERS IN A SOCIAL NETWORK

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/667,460

(22) Filed: Aug. 2, 2017

(65) Prior Publication Data

US 2017/0329761 A1    Nov. 16, 2017

Related U.S. Application Data

(63) Continuation of application No. 14/024,817, filed on Sep. 12, 2013.

(51) Int. Cl.
*G06F 17/30* (2006.01)
*G06F 17/27* (2006.01)
(Continued)

(52) U.S. Cl.
CPC ............ *G06F 17/274* (2013.01); *G06F 17/24* (2013.01); *G06F 17/273* (2013.01); *H04L 51/32* (2013.01); *H04L 67/22* (2013.01)

(58) Field of Classification Search
CPC .................................................... G06F 17/274
See application file for complete search history.

(56) References Cited

U.S. PATENT DOCUMENTS 9,027,105 B1    5/2015    Saylor
2010/0082751 A1    4/2010    Meijer et al.
(Continued)

OTHER PUBLICATIONS

Tagliamonte et al., "Linguistic Ruin? LOL! Instant Messaging and Teen Language," American Speech, vol. 83, No. 1, University of Toronto, Spring 2008, pp. 3-34.
(Continued)

*Primary Examiner* — Mohammad S Rostami
(74) *Attorney, Agent, or Firm* — Robert A. Voigt, Jr.; Winstead, P.C.

(57) ABSTRACT

A method, system and computer program product for checking documents using colloquialisms. Colloquialisms used in messages by users in a social network are tracked. The relationships (e.g., co-worker) between the senders and recipients of these messages are identified. A social graph is then generated to depict the relations between the users in the social network based on these identified relationships. Furthermore, usage patterns of colloquialisms (e.g., a particular colloquialism is used only with close friends as opposed to co-workers) are formulated. A rule set is generated using the social graph and formulated usage patterns. By using the rule set to check documents, documents may be more accurately checked for spelling and/or grammatical errors by taking into consideration the appropriate usage of colloquialisms based on the context (e.g., communicating with a friend). Furthermore, alternative words or phrases may be appropriately recommended based on the context using such a rule set.

18 Claims, 3 Drawing Sheets

(51) Int. Cl.
  *H04L 12/58* (2006.01)
  *G06F 17/24* (2006.01)
  *H04L 29/08* (2006.01)

(56) References Cited

U.S. PATENT DOCUMENTS

| | | | |
|---|---|---|---|
| 2011/0010384 A1* | 1/2011 | Luo | G06Q 10/10 707/769 |
| 2011/0119258 A1 | 5/2011 | Forutanpour et al. | |
| 2011/0178793 A1 | 7/2011 | Giffin et al. | |
| 2011/0258204 A1 | 10/2011 | Hubbard et al. | |
| 2012/0179449 A1 | 7/2012 | Raskino et al. | |
| 2012/0203640 A1* | 8/2012 | Karmarkar | G06F 1/1686 705/14.66 |
| 2012/0245925 A1 | 9/2012 | Guha et al. | |
| 2012/0259619 A1 | 10/2012 | Hall | |
| 2012/0290407 A1 | 11/2012 | Hubbard et al. | |
| 2014/0040282 A1 | 2/2014 | Mann et al. | |
| 2014/0046661 A1 | 2/2014 | Bruner | |
| 2014/0337989 A1 | 11/2014 | Orsini et al. | |
| 2015/0046496 A1* | 2/2015 | Karmarkar | G09B 7/00 707/798 |
| 2015/0074172 A1* | 3/2015 | Banatwala | G06F 17/274 709/202 |

OTHER PUBLICATIONS

Taranto et al., "Academic Social Networking Brings Web 2.0 Technologies to the Middle Grades," Middle School Journal, May 2011, pp. 12-19.

Lin et al., "Labeling Categories and Relationships in an Evolving Social Network," Advances in Information Retrieval, 30th European Conference on IR Research, ECIR 2008, Lecture Notes in Computer Science, vol. 4956, 2008, pp. 77-88.

* cited by examiner

CHECKING DOCUMENTS FOR SPELLING AND/OR GRAMMATICAL ERRORS AND/OR PROVIDING RECOMMENDED WORDS OR PHRASES BASED ON PATTERNS OF COLLOQUIALISMS USED AMONG USERS IN A SOCIAL NETWORK

TECHNICAL FIELD

The present invention relates generally to communications, and more particularly to checking documents for spelling and/or grammatical errors and/or providing recommended words or phrases based on patterns of colloquialisms used among users in a social network.

BACKGROUND

Messages are sent between users of a computing device, such as via electronic mail ("e-mail"), instant messaging, social media (e.g., social networking sites), text messaging, etc. In the context of these messages between the sender and the recipient, the sender may include a colloquialism in the message. A colloquialism is a word, phrase or paralanguage that is employed in conversational or informal language. Colloquialisms are used in "everyday" conversation, and, increasingly, through informal online interactions. Examples of colloquialisms include words, such as "gonna," "wanna," and "ya'll," as well as phrases, such as "old as the hills," "raining cats and dogs," "dead as a doornail," and "what's up." Such use of colloquialisms is appropriate in specific contexts.

Often, an application program, such as a spell checker and/or grammar checker, will be used to spell check and/or grammar check the message (e.g., e-mail, instant message) prior to the sender transmitting the message to the recipient. However, such application programs may not be tuned to the use of colloquialisms, let alone the appropriate usage of the colloquialisms based on the context. As a result, such application programs may not correctly spell and/or grammar check the message. Furthermore, programs, such as a thesaurus, that offer alternative words or phrases similar to the meaning of a designated word or phrase do not take into consideration colloquialisms. Hence, these programs are limited in their recommended alternative words or phrases to be used.

SUMMARY

In one embodiment of the present invention, a method for checking documents using colloquialisms comprises tracking colloquialisms used in messages by users in a social network. The method further comprises identifying relationships between senders and recipients of the messages using the colloquialisms. The method additionally comprises generating a social graph to depict relations between the users in the social network based on the identified relationships. Furthermore, the method comprises formulating usage patterns of the colloquialisms among the users of the social graph. Additionally, the method comprises generating a rule set based on the social graph and the usage patterns of the colloquialisms among the users of the social graph. In addition, the method comprises reviewing, by a processor, a document using the generated rule set.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for checking documents using colloquialisms. In one embodiment of the present invention, colloquialisms used in messages by users in a social network (e.g., online community) are tracked. The relationships (e.g., friend, co-worker, relative) between the senders and recipients of these messages are identified. A social graph may then be generated to depict the relations between the users in the social network based on these identified relationships. Furthermore, usage patterns of colloquialisms among the users of the social graph are formulated, where the usage patterns of colloquialisms may be based on a variety of factors, such as the frequency of collaboration between the senders and recipients of the messages using the colloquialisms, the degree of separation (e.g., socially directly connected with a user versus socially connected with a user by a $2^{nd}$ degree, such as a friend of a friend) between the senders and recipients of the message using the colloquialisms, the number of occurrences of the sender sending the same colloquialisms to other users in the social network, the type of online community (e.g., community for teachers, community for fans of the Detroit Tigers baseball team) the messages using the colloquialisms are posted, etc. A rule set for checking documents for spelling and/or grammatical errors and/or for providing recommended alternative words or phrases is generated based on the social graph and the formulated usage patterns of colloquialisms. A document is then reviewed using the generated rule set for spelling and/or grammatical errors as well as for making contextual relevant recommendations using the generated rule set. By using the generated rule set to check documents, documents may be more accurately checked for spelling and/or grammatical errors by taking into consideration the appropriate usage of colloquialisms based on the context (e.g., the use of "gonna" may be appropriate for communicating with a best friend but may not be appropriate in communicating with a work colleague). Furthermore, alternative words or phrases may be appropriately recommended based on the context (e.g., the parties in the e-mail thread) using such a rule set.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
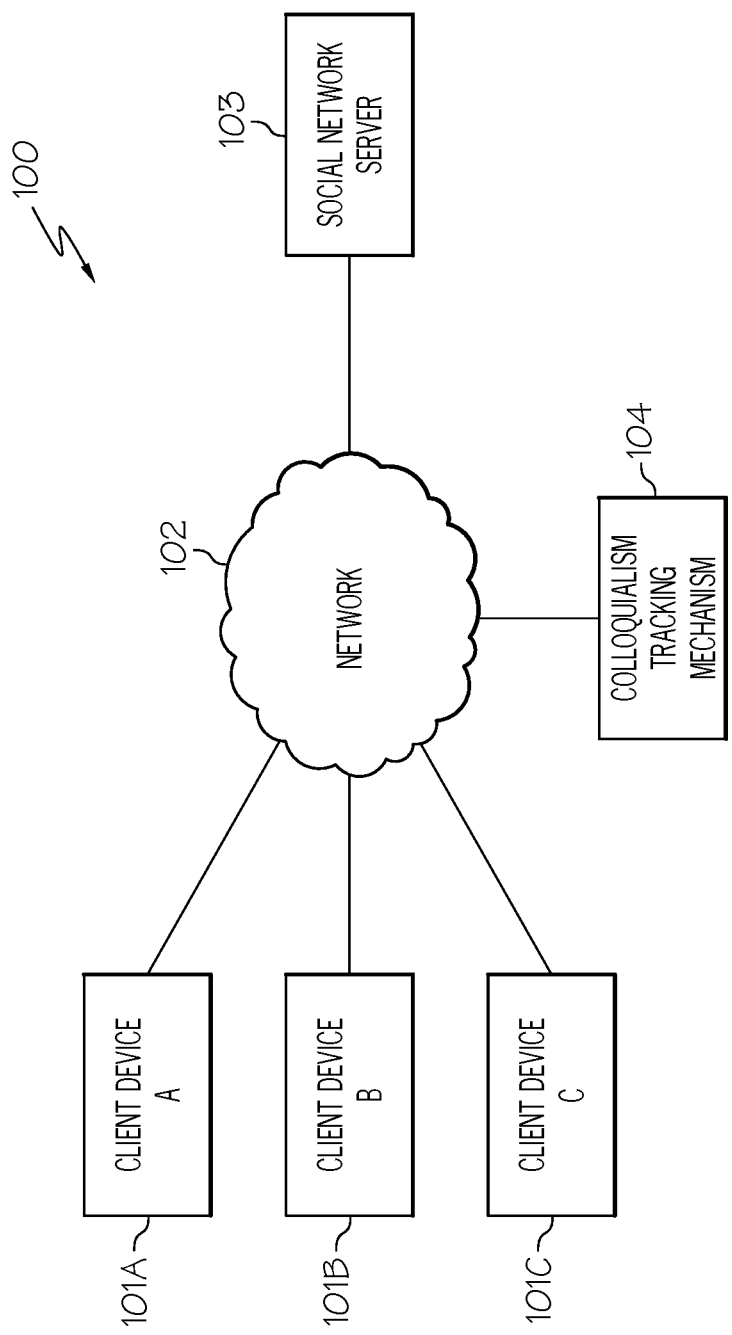
FIG. 1 illustrates a social network system configured in accordance with an embodiment of the present invention.

Referring now to the Figures in detail, FIG. 1 illustrates a social network system 100 configured in accordance with an embodiment of the present invention. Social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which be a web server configured to offer a social networking and/or microblogging service, enabling users of client devices 101 to send and read other users' messages (e.g., e-mail message, instant message). "Messages," as used herein, include a status update, microblog or text-based message that includes any one or more of the following: text (e.g., comments, sub-comments and replies), audio, video images, etc. A user of client device 101 that sends a message is said to be a "sender." A user of client device 101 that receives a message issued by a sender is said to be a "recipient." Social network server 103 is connected to network 102 by wire or wirelessly. While FIG. 1 illustrates a single social network server 103, it is noted for clarity that multiple servers may be used to implement the social networking and/or microblogging service.

System 100 further includes a colloquialism tracking mechanism 104 connected to network 102 by wire or wirelessly. Colloquialism tracking mechanism 104 is configured to track colloquialisms used in messages by users in a social network and to check documents, such as checking documents for spelling and/or grammatical errors and/or for offering alternative words or phrases, using these tracked colloquialisms as discussed in further detail below. A description of the hardware configuration of colloquialism tracking mechanism 104 is provided below in connection with FIG. 2.

System 100 is not to be limited in scope to any one particular network architecture. System 100 may include any number of client devices 101, networks 102, social network servers 103 and colloquialism tracking mechanism mechanisms 104. Furthermore, in one embodiment, colloquialism tracking mechanism 104 may be part of social network server 103. In another embodiment, colloquialism tracking mechanism 104 may be part of client device 101. In another embodiment, the aspect of generating a rule set based on the generated social graph and the usage patterns of the colloquialism among the users of the social graph, as discussed further below, may be performed by a program of colloquialism tracking mechanism 104; whereas, the aspect of checking documents (e.g., checking documents for spelling and/or grammatical errors and/or for offering alternative words or phrases) may be performed by a program of client device 101 using the generated rule set of colloquialism tracking mechanism 104.

Figure 2:
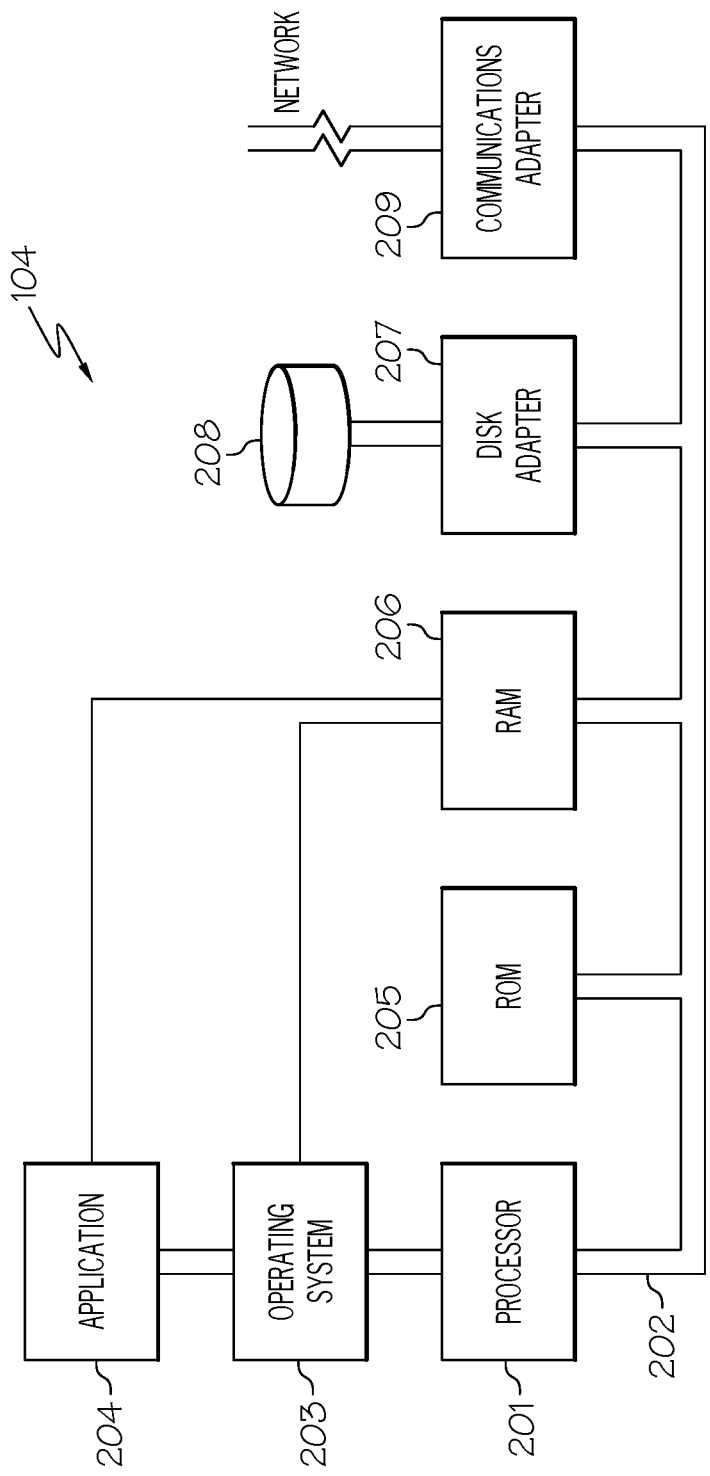
FIG. 2 illustrates a hardware configuration of a colloquialism tracking mechanism configured in accordance with an embodiment of the present invention.

Referring now to FIG. 2, FIG. 2 illustrates a hardware configuration of a colloquialism tracking mechanism 104 (FIG. 1) which is representative of a hardware environment for practicing the present invention. Referring to FIG. 2, colloquialism tracking mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for checking documents using colloquialisms as discussed further below in association with FIG. 3.

Referring again to FIG. 2, read-only memory ("ROM") 205 is coupled to system bus 202 and includes a basic input/output system ("BIOS") that controls certain basic functions of colloquialism tracking mechanism 104. Random access memory ("RAM") 206 and disk adapter 207 are also coupled to system bus 202. It should be noted that software components including operating system 203 and application 204 may be loaded into RAM 206, which may be colloquialism tracking mechanism's 104 main memory for execution. Disk adapter 207 may be an integrated drive electronics ("IDE") adapter that communicates with a disk unit 208, e.g., disk drive. It is noted that the program for checking documents using colloquialisms, as discussed further below in association with FIG. 3, may reside in disk unit 208 or in application 204.

Colloquialism tracking mechanism 104 may further include a communications adapter 209 coupled to bus 202. Communications adapter 209 interconnects bus 202 with an outside network (e.g., network 102 of FIG. 1) thereby allowing colloquialism tracking mechanism 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, messages are sent between users of a computing device, such as via electronic mail ("e-mail"), instant messaging, social media (e.g., social networking sites), text messaging, etc. In the context of these messages between the sender and the recipient, the sender may include a colloquialism in the message. A colloquialism is a word, phrase or paralanguage that is employed in conversational or informal language. Colloquialisms are used in "everyday" conversation, and, increasingly, through informal online interactions. Examples of colloquialisms include words, such as "gonna," "wanna," and "ya'll," as well as phrases, such as "old as the hills," "raining cats and dogs," "dead as a doornail," and "what's up." Such use of colloquialisms is appropriate in specific contexts. Often, an application program, such as a spell checker and/or grammar checker, will be used to spell check and/or grammar check the message (e.g., e-mail, instant message) prior to the sender transmitting the message to the recipient. However, such application programs may not be tuned to the use of colloquialisms, let alone the appropriate usage of the colloquialisms based on the context. As a result, such application programs may not correctly spell and/or grammar check the message. Furthermore, programs, such as a thesaurus, that offer alternative words or phrases similar to the meaning of a designated word or phrase do not take into consideration colloquialisms. Hence, these programs are limited in their recommended alternative words or phrases to be used.

The principles of the present invention provide a means for checking documents, such as checking documents for spelling and grammatical errors, as well as for offering alternative words or phrases, by taking into consideration colloquialisms as discussed further below in association with FIG. 3.

Figure 3:
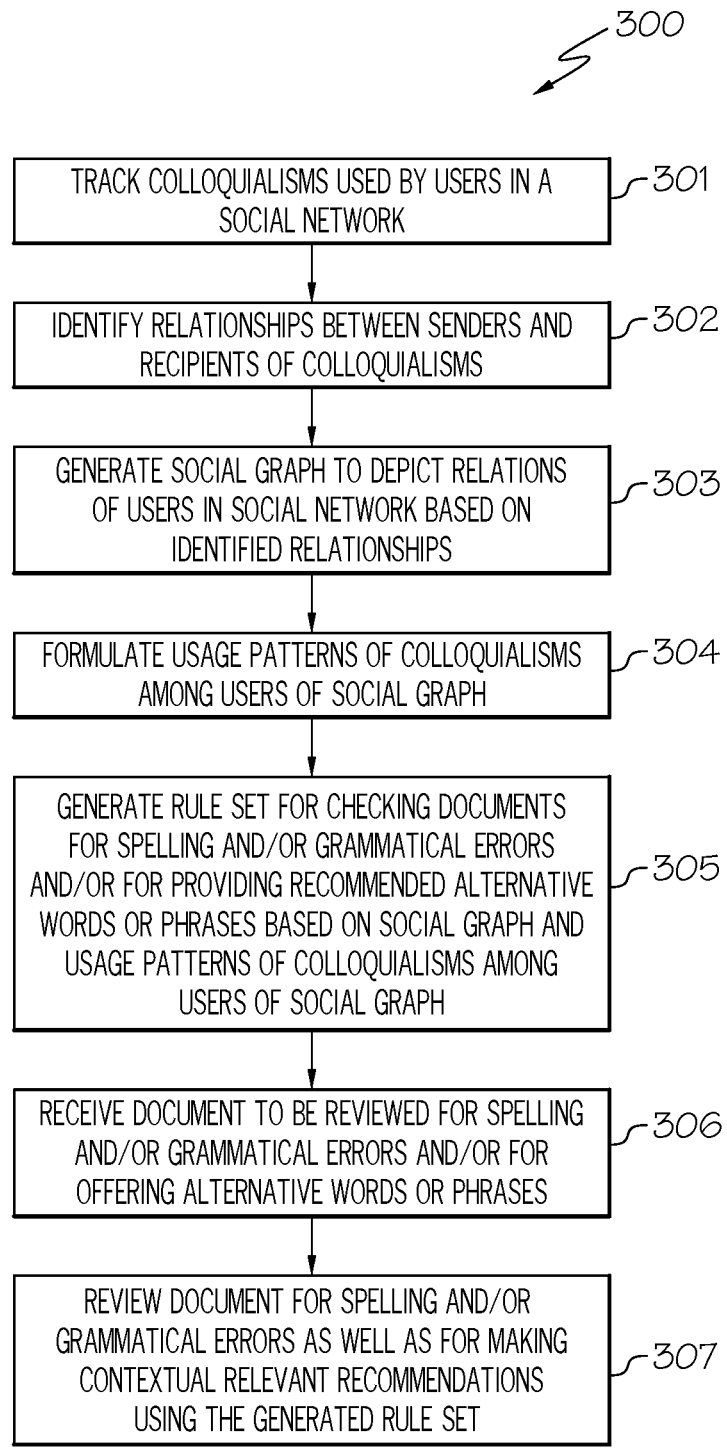
FIG. 3 is a flowchart of a method for checking documents using colloquialisms in accordance with an embodiment of the present invention.

FIG. 3 is a flowchart of a method 300 for checking documents using colloquialisms in accordance with an embodiment of the present invention.

Referring to FIG. 3, in conjunction with FIGS. 1-2, in step 301, colloquialism tracking mechanism 104 tracks colloquialisms used by users of client devices 101 in a social network (e.g., online community). For example, a user of client device 101A may send a message (e.g., text message, e-mail message) to a user of client device 101B using a colloquialism (e.g., "raining cats and dogs") in the message.

In step 302, colloquialism tracking mechanism 104 identifies the relationships between the senders and recipients of the colloquialisms. For example, the user of client device 101A may send a message to his/her sibling, who is the user of client device 101B. Colloquialism tracking mechanism 104 would then identify the relationship between the users of client devices 101A, 101B as being siblings. Other types of relationships that may be identified, include, but not limited to, friend, fan, colleague, relative (e.g., parent, spouse, child), etc.

In step 303, colloquialism tracking mechanism 104 generates a social graph to depict relations between the users (e.g., users of client devices 101) in the social network based on the relationships identified in step 302.

In step 304, colloquialism tracking mechanism 104 formulates usage patterns of colloquialisms among the users (e.g., users of client devices 101) of the social graph. The usage patterns of colloquialisms may be based on a variety of factors, such as the frequency of collaboration between the senders and recipients of the messages using the colloquialisms, the degree of separation (e.g., socially directly connected with a user versus socially connected with a user by a $2^{nd}$ degree, such as a friend of a friend) between the senders and recipients of the message using the colloquialisms, the number of occurrences of the sender sending the same colloquialisms to other users in the social network, the type of online community (e.g., community for teachers, community for fans of the Detroit Tigers baseball team) the messages using the colloquialisms are posted, etc.

In step 305, colloquialism tracking mechanism 104 generates a rule set for checking documents for spelling and/or grammatical errors and/or for providing recommended alternative words or phrases (such as a thesaurus) based on the generated social graph of step 303 and the formulated usage patterns of colloquialisms of step 304. Such a rule set is dynamic in that the rule set will reflect the changes to the usage and appropriateness of colloquialisms. For example, a particular user of client device 101 may share a particular colloquialism among a different group of users over time. In another example, a colloquialism (e.g., "raining cats and dogs") may become more acceptable thereby becoming increasing used in formal interactions as opposed to being limited to informal interactions.

In step 306, colloquialism tracking mechanism 104 receives a document to be reviewed for spelling and/or grammatical errors and/or for offering alternative words or phrases.

In step 307, colloquialism tracking mechanism 104 reviews the document for spelling and/or grammatical errors as well as for making contextual relevant recommendations using the generated rule set. By using the rule set generated in step 305, documents may be more accurately checked for spelling and/or grammatical errors by taking into consideration the appropriate usage of colloquialisms based on the context (e.g., the use of "gonna" may be appropriate for communicating with a best friend but may not be appropriate in communicating with a work colleague). Furthermore, alternative words or phrases may be appropriately recommended based on the context (e.g., the parties in the e-mail thread) using such a rule set.

While the steps of method 300 are described as being performed solely by colloquialism tracking mechanism 104, it is noted that some of the steps may be performed by a program of client device 101, such as the aspect of checking documents (e.g., checking documents for spelling and/or grammatical errors and/or for offering alternative words or phrases) using the generated rule set of colloquialism tracking mechanism 104.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for checking documents using colloquialisms, the computer program product comprising a computer readable storage medium having program code embodied therewith, the program code comprising the programming instructions for:
   tracking colloquialisms used in messages by users in a social network, wherein said colloquialisms are words or phrases used in informal online communications, wherein said colloquialisms comprise words or phrases that vary from region to region;
   identifying relationships between senders and recipients of said messages using said colloquialisms;
   generating a social graph to depict relations between said users in said social network based on said identified relationships;
   formulating usage patterns of said colloquialisms among said users of said social graph;
   generating a rule set based on said social graph; and
   reviewing a document for spelling and/or grammatical errors and/or for making contextual relevant recommendations using said generated rule set.

2. The computer program product as recited in claim 1, wherein said generated rule set is used for checking said document for one or more of the following: spelling errors and grammatical errors.

3. The computer program product as recited in claim 1, wherein said generated rule set is used for providing recommended alternative words or phrases.

4. The computer program product as recited in claim 1, wherein the program code further comprises the programming instructions for:
   generating said rule set based on said social graph and said usage patterns of said colloquialisms among said users of said social graph.

5. The computer program product as recited in claim 1, wherein said usage patterns of said colloquialisms are based on a frequency of collaboration between said senders and recipients of said messages using said colloquialisms.

6. The computer program product as recited in claim 1, wherein said usage patterns of said colloquialisms are based on a degree of separation between said senders and recipients of said messages using said colloquialisms.

7. The computer program product as recited in claim 1, wherein said usage patterns of said colloquialisms are based on occurrences of said colloquialisms among other users in said social network.

8. The computer program product as recited in claim 1, wherein said usage patterns of said colloquialisms are based on a type of online community said messages using said colloquialisms are posted.

9. The computer program product as recited in claim 1, wherein the program code further comprises the programming instructions for:
   receiving said document to be reviewed for spelling and/or grammatical errors and/or for offering alternative words or phrases.

10. A system, comprising:
   a memory unit for storing a computer program for checking documents using colloquialisms; and
   a processor coupled to the memory unit, wherein the processor is configured to execute the program instructions of the computer program comprising:
      tracking colloquialisms used in messages by users in a social network, wherein said colloquialisms are words or phrases used in informal online communications, wherein said colloquialisms comprise words or phrases that vary from region to region;
      identifying relationships between senders and recipients of said messages using said colloquialisms;
      generating a social graph to depict relations between said users in said social network based on said identified relationships;
      formulating usage patterns of said colloquialisms among said users of said social graph;
      generating a rule set based on said social graph; and
      reviewing a document for spelling and/or grammatical errors and/or for making contextual relevant recommendations using said generated rule set.

11. The system as recited in claim 10, wherein said generated rule set is used for checking said document for one or more of the following: spelling errors and grammatical errors.

12. The system as recited in claim 10, wherein said generated rule set is used for providing recommended alternative words or phrases.

13. The system as recited in claim 10, wherein the program instructions of the computer program further comprise:
   generating said rule set based on said social graph and said usage patterns of said colloquialisms among said users of said social graph.

14. The system as recited in claim 10, wherein said usage patterns of said colloquialisms are based on a frequency of collaboration between said senders and recipients of said messages using said colloquialisms.

15. The system as recited in claim 10, wherein said usage patterns of said colloquialisms are based on a degree of separation between said senders and recipients of said messages using said colloquialisms.

16. The system as recited in claim 10, wherein said usage patterns of said colloquialisms are based on occurrences of said colloquialisms among other users in said social network.

17. The system as recited in claim 10, wherein said usage patterns of said colloquialisms are based on a type of online community said messages using said colloquialisms are posted.

18. The system as recited in claim 10, wherein the program instructions of the computer program further comprise:
   receiving said document to be reviewed for spelling and/or grammatical errors and/or for offering alternative words or phrases.

* * * * *